Oct. 1, 1963 J. L. BERGGREN 3,105,692

RECORD TABLE DRIVES FOR SOUND REPRODUCTION MACHINES

Filed March 14, 1960

INVENTOR.
John L. Berggren
BY
Francis G. Boswell
ATTY.

United States Patent Office 3,105,692
Patented Oct. 1, 1963

3,105,692
RECORD TABLE DRIVES FOR SOUND REPRODUCTION MACHINES

John L. Berggren, 818 W. Water St., Lewistown, Mont.
Filed Mar. 14, 1960, Ser. No. 14,578
2 Claims. (Cl. 274—39)

Conventionally sound reproduction machines for use with records of the disk type are provided with a record table rotating on a vertical axis and driven at a constant angular speed. Since the sound groove on the record follows a spiral from the periphery of the record to approximately its center, the linear speed of the sound groove drops off as the stylus approaches the center of the record and thus, while the recorded sounds may be true at the begining of the record, they are not true reproductions at the end of the sound groove. While the distortion may not be noticeable to the average ear, it is nevertheless a distortion which progressively increases as the needle or stylus moves toward the center of the record.

The object of the invention, therefore, is to provide a driving means for the record table which will progressively increase its angular velocity at such a rate that a constant linear speed is given to the sound groove and thus recorded sounds true at the beginning of the sound groove remain true to the end thereof; to provide a driving means for the record table which will be free from mechanical difficulties; to provide such a driving means with an adjustable feature so that the linear speed may be varied anywhere between maximum and minimum speeds to initially secure the desired linear speed for the sound groove; and to provide a record table driving means which is of simple form, susceptible of cheap manufacture and of a character that reduces disarrangement of any part to a minimum.

With this object in view the invention consists in a construction and combination of parts of which a preferred embodiment is illustrated in the accompanying drawings, wherein.

Figures 1, 2, 3:
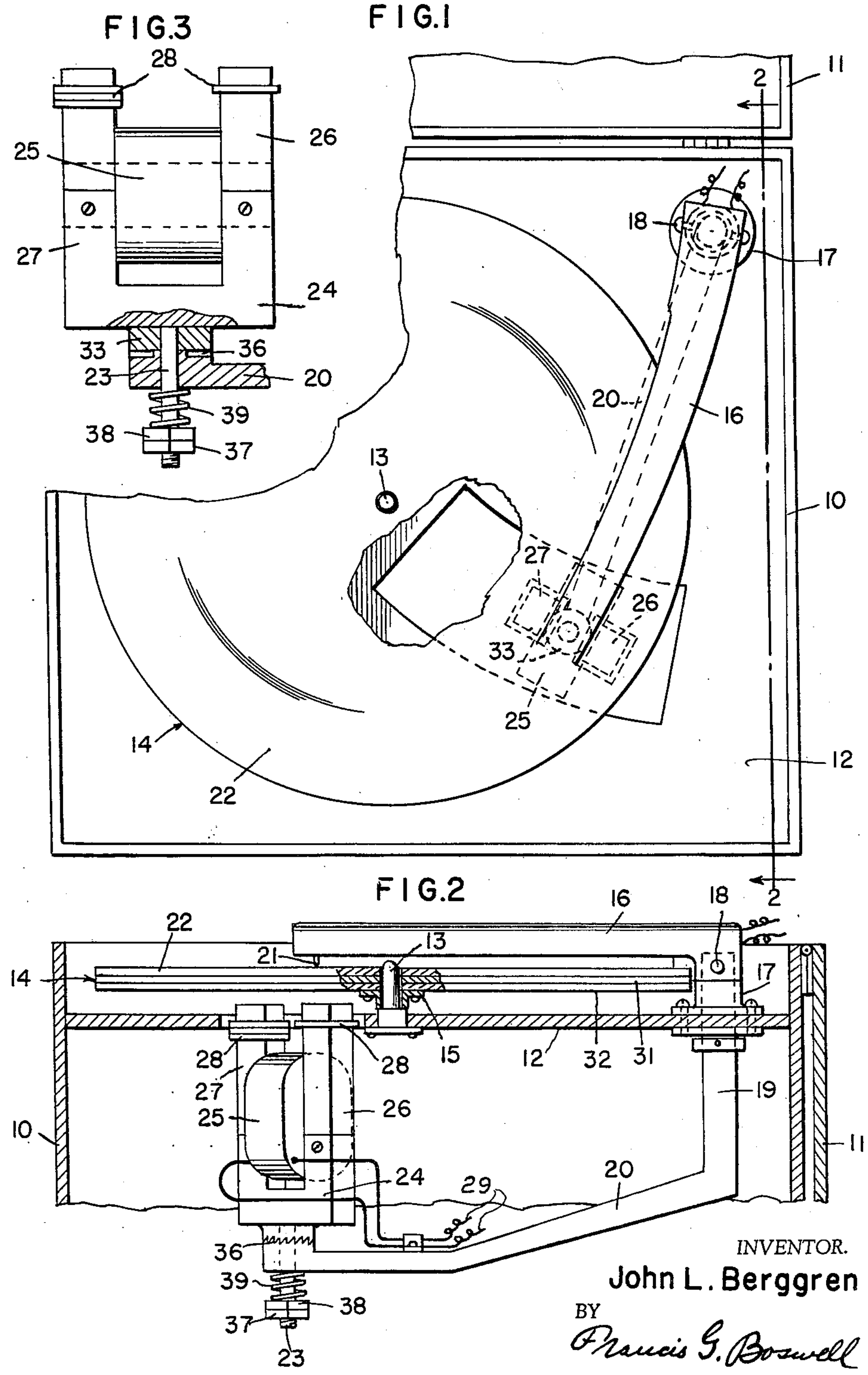
FIGURE 1 is a top plan view of an acceptable form of the invention.
FIGURE 2 is a sectional view on the plane indicated by the line 2—2 of FIGURE 1.
FIGURE 3 is an elevational view of the inductor and its supporting cradle.

As illustrated, the invention is shown applied to a simple sound reproducing machine enclosed in a case 10 having a swingingly mounted cover 11 and an interior partition 12 in the center of which is mounted a post 13 which supports the record table 14, the latter having a center bearing 15 which is journaled on the post 13, so that the table may readily rotate. As in the conventional apparatus, the tone arm 16 is mounted in the corner bearing 17 in the partition 12, being pivotally mounted, at 18, on a stem 19 which is a right-angular extension of an arm 20. As in conventional practice also, the tone arm carries the stylus 21 over the record 22 mounted on the table 14. The pivotal mounting 18 provides for slightly swinging movement of the tone arm in a vertical plane but precludes any regular movement with respect to the stem 19.

The tone arm and the arm 20 lie in the same vertical plane, that is, the arm 20 is directly under the tone arm, even though it is below the partition 12, while the tone arm is above the record 22. The arm 20, at its outer or free end is provided with an eye for the reception of the stem 23 which is pendent from the cradle 24 supporting the inductor which consists of a U-shaped magnet with an energizing coil 25 between the legs 26 and 27. The legs and other portions of the core of the magnet are, of course, of magnetic material and since the inductor is energized with alternating current, the magnet core, including the legs, is laminated. The two poles of the magnet are progressively lagged with copper rings 28, there being one around the upper portion of the leg 26 and two or more (three being shown) around the leg 27. The parts are so proportioned, that the axis of the stem 25 passes through the point of contact of the stylus with the record and the inductor, for the greatest speed, is positioned with the poles 26 and 27 in a vertical plane normal to the vertical plane of the axis of the arm 20. Thus, when the coil 25 is energized from a suitable alternating current source, as through the conductors 29, the poles generate current in the laminae 31 and 32 which are part of the record table, being secured to the under face thereof. The lamina 31 is preferably of copper, while the lamina 32 is of a magnetic material, such as iron. The copper induces the quick formation of eddy currents which the iron retains, at least that appears to be the case from experiments made. Eddy currents induced by the pole 26 remain until they are acted upon by pole 27 whose effective polarity lags behind that of the pole 26 due to the increasing lag provided by the plurality of rings 28. The record table being set in motion, the sound groove of the contained record moves the tone arm inwardly toward the center post and this operation results in the inductor being carried with it. Since the inductor determines the linear speed, the angular speed will increase as the inductor moves toward the center post and thus the linear speed of the sound record is maintained constant.

In order that an initial linear speed may be determined, the inductor is adjustable in position. The cradle 24 is formed with the boss 33 in which the stem 23 is centered. This boss, and the contacting surface of the arm 20 are serrated as indicated at 36, that is, there is a series of intercurrent teeth on the two, so that when the cradle is turned, the inductor will be maintained in the adjusted position. Between the under face of the arm 20 and a nut 37 and a lock nut 38 screwed onto the stem 23, there is a compression spring 39. This yieldingly holds the cradle down against the arm 20, so that the intercurrent teeth will prevent any angular or turning movement of the cradle.

Adjustment of the inductor out of the normal position above described will result in reduction of the speed, depending on the degree to which the inductor has been adjusted. In other words, if adjusted to the point where the two poles 26 and 27 lie in the same vertical plane with that of the axis of the arm 20, there will be no motion of the record table, but any position at variance with this will result in a speed depending on the angular position of the inductor with respect to the arm 20. But this adjustment of the inductor will determine the initial angular speed and this will be progressively increased as the arm 20 moves inward with the tone arm, just as in the position of the poles for greatest angular speed.

The inductor being energized by an alternating current of which the frequency is, of course, kept constant, the linear speed of the sound groove of the record, having once been determined, will thereafter be positively retained constant, so that there will be no distortion in reproduction by backlash, as in mechanical driving connections between the actuating motor and record table.

The invention having been described, what is new and useful is:

1. In combination with a sound reproducing machine of the type having a horizontally disposed record table connected for rotation and adapted to support a disk record and having a movable tone arm provided with a stylus traversing the sound groove of the record; laminae respectively of magnetic and non-magnetic electrically conductive material connected to the underface of the record table, a laminated single U-shaped ferromagnetic core member having upwardly extending spaced leg portions and carrying an inductor therebetween positioned beneath said laminae to impart rotative movement to the record table when the inductor is energized; arm means connected for movement with the tone arm and extending beneath the record table, locking means carried by one end of said arm means, corresponding locking means carried by said U-shaped core and yieldably connected to coact with the first locking means to secure said U-shaped core in selected position on said arm means for synchronous positional adjustment of said U-shaped core and the inductor by the tone arm as the stylus traverses the record sound groove to secure a fixed selected linear speed of the table carried record's sound groove, and the U-shaped core being selectively rotatively adjustable on said arm means through the respective locking means on a vertical axis passing through the point of the stylus of the tone arm for selecting a desired record table speed.

2. In combination with a sound reproducing machine of the type having a horizontally disposed rotating record table adapted to support a disk record and having a movable tone arm provided with a stylus traversing the sound groove of the record; laminae of magnetic and non-magnetic electrically conductive material connected to the underface of the record table, a single electromagnetic driving means positioned beneath said laminae to impart rotative movement to the record table when energized, an extension arm connected for lateral movement with the tone arm and extending beneath the record table and having a terminating end, locking means carried by the terminating end of the extension arm, corresponding locking means connected to said electromagnetic driving means and yieldably connected to said terminating end to coact with said first locking means to lock said electromagnetic driving means in selective position on said extended arm for constant positional adjustment thereof beneath the record table by the tone arm as the stylus traverses the record sound groove to provide a fixed selected linear speed to the record's sound groove, and said electromagnetic driving means being selectively rotatable on said extension arm through the respective locking means on a vertical axis passing through the point of the tone arm stylus and the center of said electromagnetic driving means for selecting a desired speed for the record table.

References Cited in the file of this patent

UNITED STATES PATENTS

| | | |
|---|---|---|
| 1,259,561 | Russ | Mar. 19, 1918 |
| 1,399,917 | Atkinson | Dec. 13, 1921 |
| 1,915,090 | Hammond | June 20, 1933 |
| 2,113,226 | Young | Apr. 5, 1938 |
| 2,505,630 | Weathers | Apr. 25, 1950 |
| 2,856,573 | Williams et al. | Oct. 14, 1958 |